United States Patent [19]
Byrne

[11] Patent Number: 5,941,720
[45] Date of Patent: *Aug. 24, 1999

[54] ELECTRICAL INTERCONNECTION ASSEMBLY

[76] Inventor: Norman R. Byrne, 2736 Honey Creek, NE., Ada, Mich. 49301

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,570

[22] Filed: Nov. 26, 1996

Related U.S. Application Data

[60] Provisional application No. 60/007,583, Nov. 27, 1995.

[51] Int. Cl.$^6$ ..................................................... H01R 25/00
[52] U.S. Cl. ............................................ 439/215; 439/717
[58] Field of Search ..................................... 439/701, 717, 439/215

[56] References Cited

U.S. PATENT DOCUMENTS

| | | | |
|---|---|---|---|
| 4,993,576 | 2/1991 | Byrne | 220/3.9 |
| 5,087,207 | 2/1992 | Byrne | 439/215 |
| 5,096,431 | 3/1992 | Byrne | 439/215 |
| 5,096,434 | 3/1992 | Byrne | 439/215 |
| 5,171,159 | 12/1992 | Byrne | 439/215 |
| 5,259,787 | 11/1993 | Byrne | 439/557 |
| 5,320,555 | 6/1994 | Okabe | 439/701 |

*Primary Examiner*—Gary Paumen
*Attorney, Agent, or Firm*—Varnum, Riddering, Schmidt & Howlett llp

[57] ABSTRACT

An interconnection assembly for use in a space-divider wall system includes first and second junction blocks for receiving electrical receptacles. A first connector is associated with the first junction block and a second connector is associated with the second junction block for mechanically securing the junction blocks together in a vertically stacked relationship. The first connector is located on a top portion of the first junction block and the second connector is located on a bottom portion of the second junction block for mating with the first connector to thereby mechanically secure the junction blocks together. Further junction blocks can also be connected to the first set of junction blocks in a side-by-side and stacked relationship. Each of the junction blocks includes electrical terminals and a connector block is attached to the electrical terminals for supplying power to the stacked junction blocks. In one embodiment the connector block has a first portion having a set of electrical terminals that is telescopically received in a second portion having a further set of electrical terminals. The sets of terminals are movable toward and away from each other for accommodating variations in spacing between terminal sets of the stacked junction blocks. At least one of the junction blocks can be L-shaped or T-shaped in configuration wherein a first set of terminals is located at one end of the junction block and a second set of terminals is located at the other end of the junction block and oriented at an angle with respect to the first set. In this manner the junction block can be installed around inner or outer corners of abutting wall or furniture panels.

13 Claims, 10 Drawing Sheets

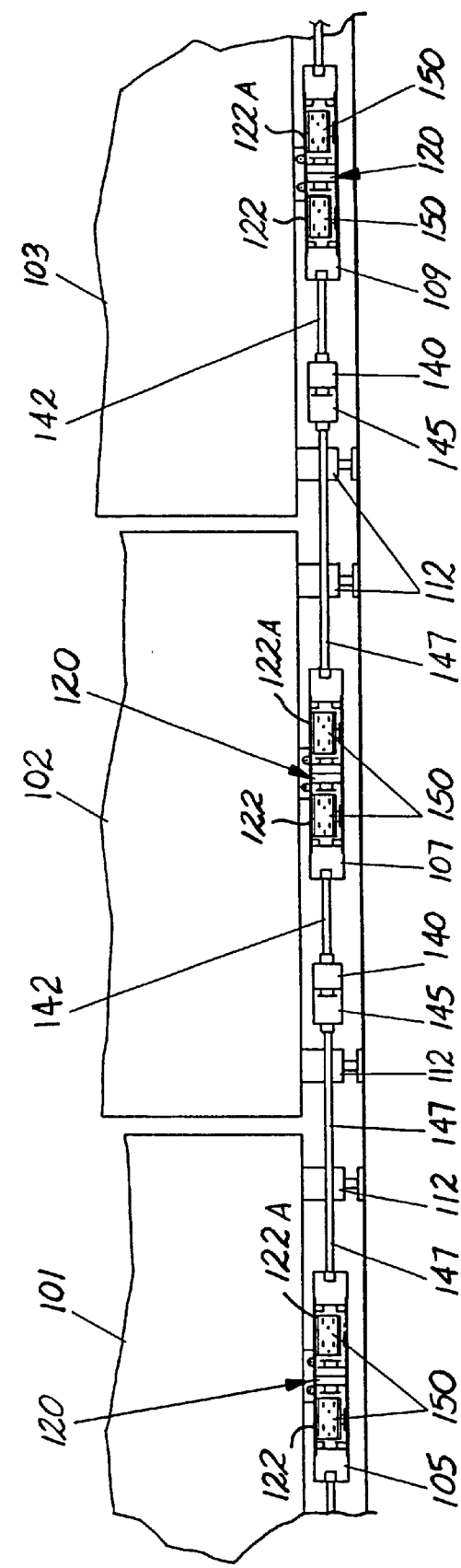

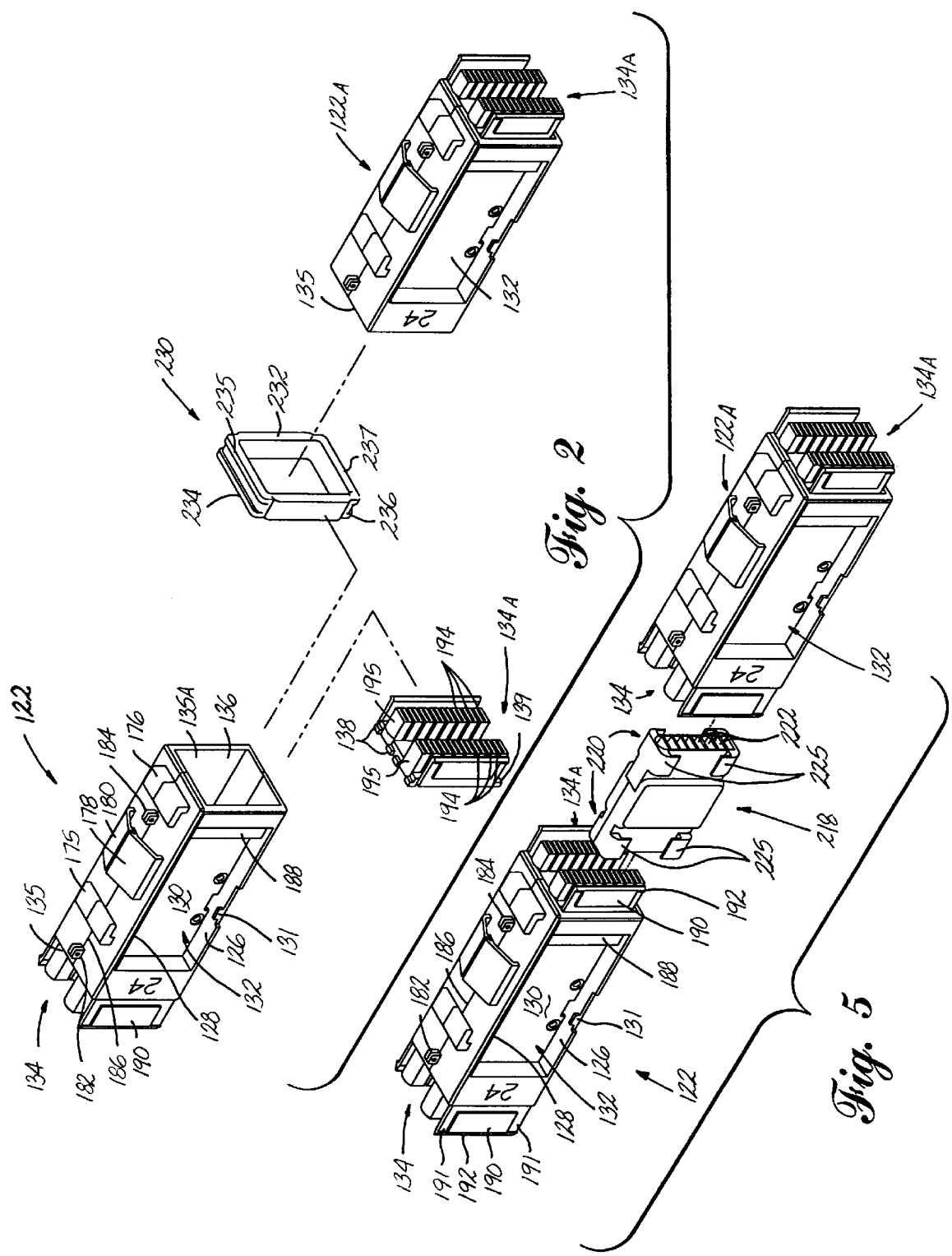

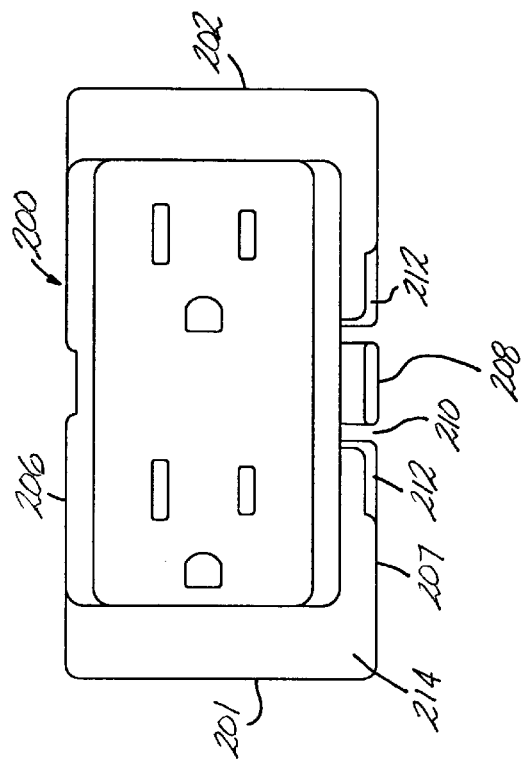
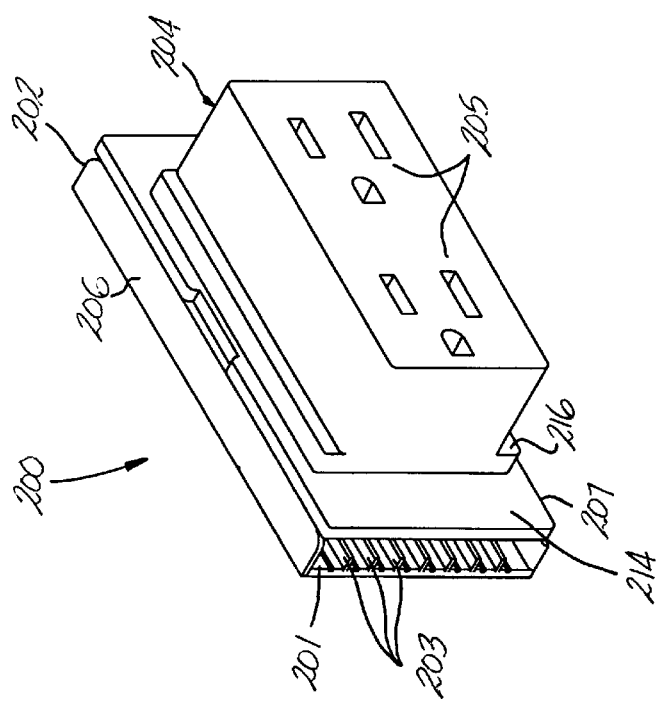

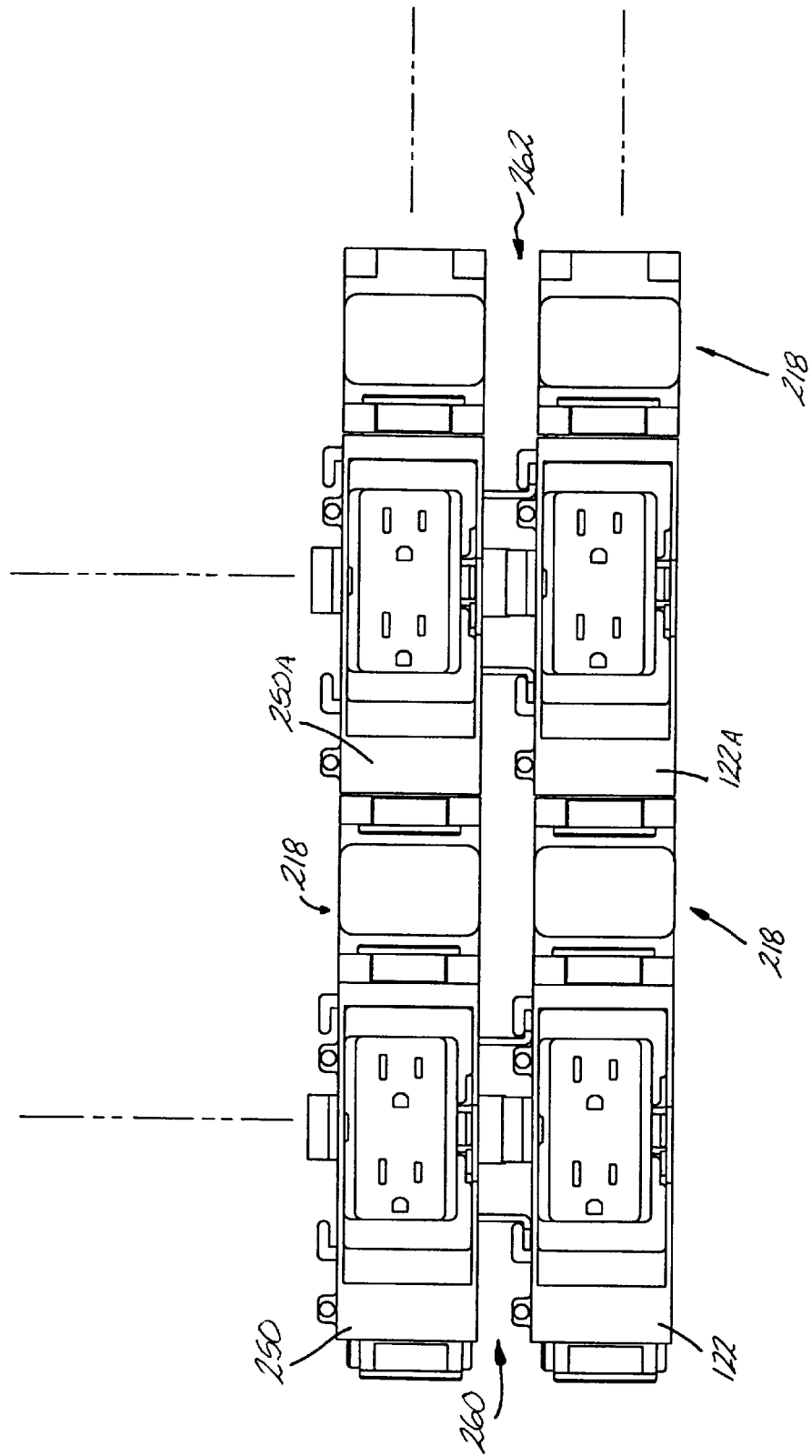

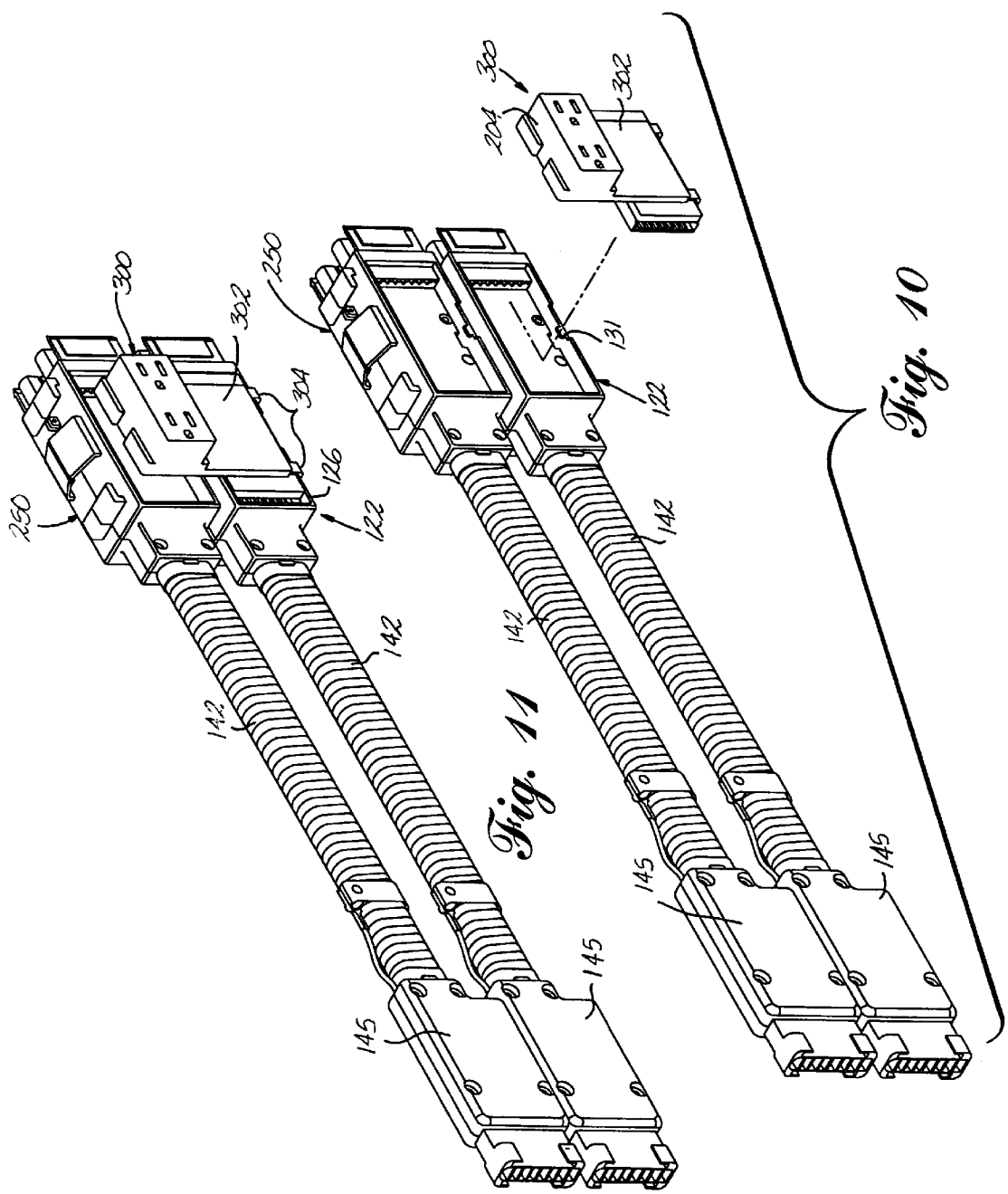

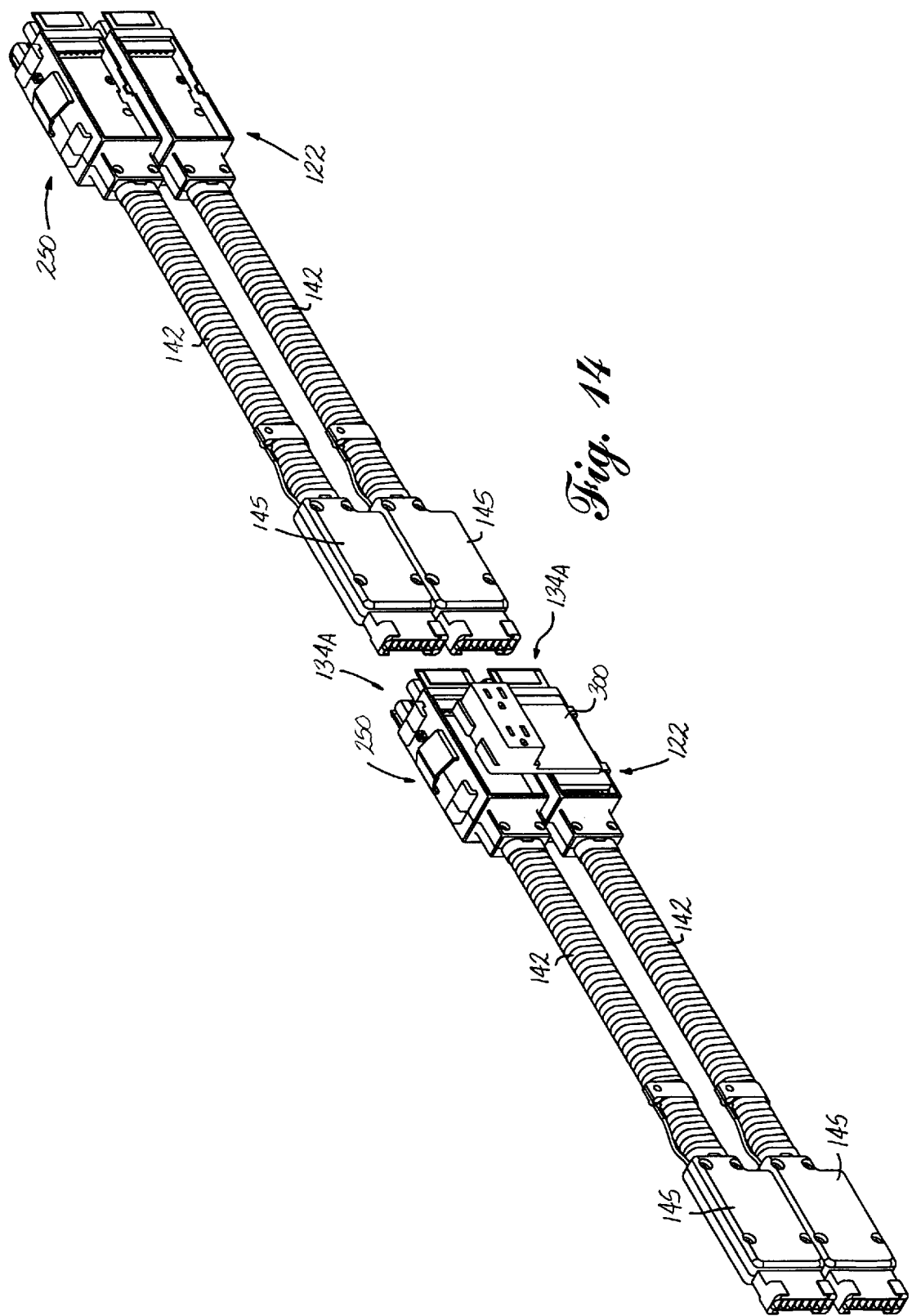

ELECTRICAL INTERCONNECTION ASSEMBLY

This application claims the benefit of U.S. Provisional Application No. 60/007,583 filed on Nov. 27, 1995.

BACKGROUND OF THE INVENTION

1. Field of the Invention

The invention pertains to electrical interconnection systems and, more particularly, to such systems for use in distributing electrical power to modular wall panels or the like.

2. Prior Art

Known interior wall systems typically employ prefabricated modular units which are joined together in various configurations to divide a work space into smaller offices or work areas. Generally, such modular wall panels are equipped with raceways, for example along a bottom edge of the modular panels, for housing electrical cabling and junction blocks in order to provide electrical outlets and electrical power connections to adjacent panels. The raceway of a modular wall unit may be provided with a male connector at one end, a female connector at another end and a pair of junction blocks. Each of the junction blocks is provided with electrical outlets. The blocks are disposed at spaced-apart positions along the raceway. Conduits, extending between the junction blocks and between the connectors and the junction blocks, provide electrical interconnection among these units.

The modular panels of a space-divider system may be configured such that adjacent panels are in a straight line or at various angular positions relative to each other. It is common to configure intersecting walls in such a fashion that three or four modular wall panels intersect at right angles. Each of the panels typically requires electrical outlets, and may require outlets on both lateral sides. In any event, electrical power usually has to be provided to all of the panels and often only one of the panels at the multiple panel junction is connected to a power supply source. Under such circumstances, the interconnecting wiring becomes a significant problem, and special modifications may have to be made to power systems of wall panels used in such a configuration. Since interchangeability of the wall panel is highly desirable, such custom modifications are preferably avoided. Furthermore, modification of the panels at the installation site is bothersome and costly.

U.S. Pat. No. 5,096,434 to Byrne, issued Mar. 17, 1992, the subject matter of which is incorporated herein by reference, has attempted to overcome this problem by providing an interconnecting system in each wall panel comprising an electrical junction block having four receptacle connectors formed integral thereto. The electrical junction block receives electrical outlet receptacles. A pair of interconnectors are electrically connected to the junction block for connecting to similar end connectors from adjacent panels. However, even with this system, it was found that locating additional junction blocks and electric cables, e.g. for a dedicated power supply to computers and/or other peripherals, adjacent to the previously installed junction blocks and cables in a wall panel was very time-consuming and difficult. The pre-existing junction blocks themselves could not be modified on site to support additional junction blocks. Such modifications were previously done at the factory and then installed on site, which became both time-consuming and labor intensive.

SUMMARY OF THE INVENTION

These and other problems with the prior art are overcome by means of an interconnecting system comprising a single building block arrangement not requiring any special couplers for connecting other junction blocks thereto and in which all existing connectors are available for use in the various different panel configurations. An electrical interconnection assembly for each panel includes an electrical junction block having a plurality of receptacle connectors formed integral thereto for interchangeably receiving electrical outlet receptacles and power cables.

According to one aspect of the invention, an interconnection assembly for use in a space-divider wall system that typically includes a plurality of modular upright wall panels having vertically extending opposite end edges and a raceway area extending at least partially between the opposite edges for supporting electrical conductors and junction blocks. The interconnection assembly comprises first and second junction blocks for receiving electrical receptacles. A first connector is associated with the first junction block and a second connector is associated with the second junction block for mechanically securing the junction blocks together in a stacked relationship.

According to a further aspect of the invention, each junction block has a first end, a second end separated from the first end, and top and bottom portions extending between and connecting the first and second ends. The first connector is located on the top portion of the first junction block and the second connector is located on the bottom portion of the second junction block for mating with the first connector to thereby mechanically secure the junction blocks together in the stacked relationship.

According to a further aspect of the invention, at least the first end of each junction block includes a first set of spaced-apart electrical terminals. A connector block has a second set of spaced-apart electrical terminals that mate with one of the first sets and a third set of spaced-apart electrical terminals that mate with the other of the first sets for supplying electrical power to each of the junction blocks.

In one embodiment, the connector block has a first portion that is telescopically received in a second portion. The third set of electrical terminals extends from the first portion and the fourth set of electrical terminals extends from the second portion such that the third and fourth sets are movable toward and away from each other for accommodating various terminal spacing between the stacked junction blocks.

According to an even further aspect of the invention, a third junction block can be connected to one of the first and second junction blocks in a side-by-side relationship.

At least one of the junction blocks according to one embodiment can be installed at the inner or outer corners of intersecting wall panels or furniture panels. The junction block includes a body having a first end, a second end separated from the first end, and top and bottom portions extending between and connecting the first and second ends. A first electrical connector portion extends from the first end in a direction generally parallel to a longitudinal axis of the body. A second electrical connector portion extends from the second end at an angle to the body longitudinal axis.

In a further junction block embodiment, a third electrical connector can extend from the second end in a direction opposite to the second electrical connector to form a T-shaped junction block.

In accordance with one aspect of the invention, each junction block is a two-sided junction block having two oppositely directed electrical connectors and a single inside receptacle connector on each side of the junction block to accommodate electrical outlet receptacles or any combination of power cables and receptacles as may be required to obtain a desired interconnection arrangement. Two or more junction blocks may be arranged such that one junction block is mechanically (and in some instances electrically) attached to another junction block. The blocks may be attached to each other in a side-by-side relationship and/or in a stacked relationship. Any number of junction blocks may be attached together in a building block arrangement. An upper surface of the junction block includes an interconnection assembly for connection to either the raceway of a wall panel or to another junction block.

In accordance with another aspect of the invention, a bottom portion of the junction block includes an assembly for engaging with the upper portion of an adjacent junction block, such that two or more adjacently located junction blocks may be stacked.

In accordance with another aspect of the invention, the junction blocks may be located in a side-by-side relationship through a side interconnection assembly associated with each junction block. The side interconnection assembly may include male or female end terminals located on at least one side of each junction block, and an intermediate male or female connection plug. The connection plug mechanically and/or electrically connects one junction block with another junction block in the side-by-side relationship. Each junction block may, in addition or alternatively, have a lip for receiving a dual flange member for securing the joining junction blocks together. When more than two junctions blocks are connected in the side-by-side relationship, either one or both of the attachment assemblies may be used.

In accordance with another aspect of the invention, when two or more junction boxes are provided in a stacked relationship, a dual plug configuration having a single cable inlet may be provided to simultaneously connect the stacked junction blocks. The dual plug connector for the stacked junction blocks may be non-adjustable where the spacing between the stacked junction blocks will always remain the same, or may be adjustable from about 2 inches to 8 inches to accommodate various spacings between vertically located junction blocks. The dual plug connector would normally carry twice as many electrical wires than the single plug connector.

In accordance with another aspect of the invention, when two junction blocks are stacked, a receptacle may be provided having a connector electrically coupled to either the upper or lower junction block, and a stretch receptacle portion that extends from the electrically connected junction block to the other junction block. This arrangement advantageously permits power from one source to be located at an outlet opening where power from the other source would normally be located. This prevents additional openings being cut in the raceway covers of wall panels, where an electrical outlet has been previously cut or otherwise provided.

In accordance with another aspect of the invention, an L-shaped or T-shaped junction block is provided for permitting another junction block to be directly connected at an angle thereto. This permits a junction block system to be installed at inside corners of computer hutches or other office furniture requiring electrical power. The terminals of the L-shaped or T-shaped blocks may be such that a direct connection is possible between the other terminal blocks, or a male/female adapter plug may be used.

BRIEF DESCRIPTION OF THE DRAWING

An illustrative embodiment of the invention is described in the following detailed description, with reference to the drawing in which:

FIG. 1 is a fragmentary elevational view of a plurality of adjacent wall panels and electrical connection assemblies arranged in accordance with the invention;

FIG. 2 is an orthographic view of a junction block having an end connector or a dual flange for connection to an additional junction block;

FIG. 3 is an orthographic view of a receptacle for connection to the junction block of the present invention;

FIG. 4 is a side view of the receptacle of FIG. 3;

FIG. 5 is an exploded orthographic view of two junction blocks being connected to each other by a double male plug adapter;

FIG. 7 is a side view showing a plurality of junction blocks stacked together and located in a side-by-side relationship using the interconnection assemblies and dual terminal male adapters of the present invention;

FIG. 10 is an orthographic view of a stacked junction block assembly having a stretch receptacle for attachment thereto;

FIG. 11 is an orthographic view of the stacked junction block assembly having the stretch receptacle attached thereto;

FIG. 14 is an orthographic view of two stacked junction block assemblies for connection to each other;

DETAILED DESCRIPTION

Figure 6:
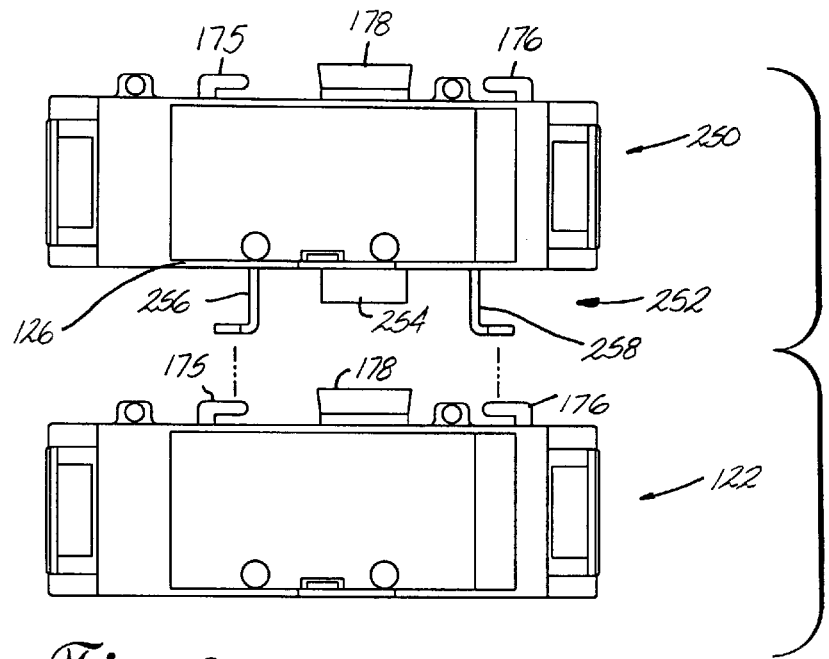
FIG. 6 is a side view of two junction blocks having interconnection assemblies for joining the blocks together in a stacked relationship.

FIG. 1 is a fragmentary elevational view of adjacent modular wall panels 101, 102, 103 of a rearrangeable wall system. The wall panels are provided with electrical interconnection assemblies 105, 107 and 109 in a raceway area formed along the lower edge of panels 101, 102 and 103. Each of the panels is provided with substantially flat support legs 112 which allow for passage of electrical conduits in the raceway. Raceway covers, customarily used, have been omitted from the drawing in FIG. 1 to better show the electrical junction assemblies. Each of the electrical interconnection assemblies 105, 107, 109 is provided with a junction block pair 120, a female electrical connector block 140 and a matching male connector block 145. The connector blocks 140, 145 are connected to associated junction block pairs 120 by means of conduit sections 142 and 147, respectively. Each of the junction block pairs 120 is shown in FIG. 1 to be provided with a pair of electrical outlet receptacles 150. Junction block pairs 120 are double sided and corresponding pairs of outlet receptacles are provided on the opposite side of each of the wall panels 101, 102 and 103 (not shown in the drawing) to allow various electrical equipment to be plugged into the outlets from either side of the panel.

Additional details regarding the interconnection assembly 105 are illustrated in the enlarged orthographic view as shown in FIGS. 2 and 5. The interconnection assembly 105 includes a junction block 122 having a lower wall 126, upper wall 128 and middle wall 130 which form an open spatial area 132 on each side of the junction block 122 (only one side of which is illustrated in FIG. 2). In addition, the block 122 includes a female connector block pair 134 extending outwardly from a first end 135 of junction block 122, and a second female connector block pair 134A attachable to open end 135A of junction block 122. Each female connector block pair 134, 134A can be independently interconnected to electrical cable within conduits 142, 147 or can be connected to a double male connector assembly as further described below with respect to FIG. 5. Moreover, one female connector block pair 134 can be electrically connected to another female connector block pair 134A through internal wiring (not shown) in the junction blocks.

For the purpose of releasably securing junction block 122 to a wall panel raceway or to the underside of an upper junction block 250 (FIG. 6), a pair of L-shaped mounting lugs 175, 176 and interlocking latch members 178, 180 are integrally mounted on the top of the upper wall 128. The junction block 122 may also be provided with connection lugs 182, 184 for securing preformed halves of the junction block 122 together along a seam line 186 as further illustrated in FIGS. 2 and 5. It is to be noted that the two halves of junction block 122 as defined by seam line 186 are identical and therefore a description with respect to one half of the junction block refers also to the other half A female receptacle connector 188 is located within each half of junction block 122 within open spatial area 132. Electrical outlet receptacle blocks 200 (FIGS. 3 and 4) are adapted to engage the female receptacle connectors 188. In this manner, each of the junction blocks 122 is adapted to support, if desired, two electrical outlet receptacle blocks 200, one on each side of the junction block 122. Female connector block pairs 134, 134A are each provided with a pair of side flanges 190 having upper and lower recessed areas 191, for engagement with flanges 225 of a male connector 220 which forms part of a cable assembly (FIG. 1) or for engagement with flanges 225 of a double male connector assembly 218 as shown in FIG. 5. Flanges 190, which are made of a resilient plastic material and formed integral to the housing to which they are connected are provided with an outwardly extending inclined end surface 192. When end surfaces 192 are engaged by flanges 225 of either male connector 220 or double male connector assembly 218, the flanges 190 will be deflected inward, allowing flanges 225 to engage recess areas 191 to provide a locking engagement of the male and female connectors. The female connector block pairs 134, 134A are each provided with two columns of a plurality of female connector terminals 194 and a key lug 195. Male connector portion 220 is provided with a plurality of male connector terminals 222 and a key opening 224 for receiving key lug 195.

Referring more specifically to FIG. 2, a junction block connector 230 includes a hollow tubular portion 232 having a pair of upper flanges 234, 235 and a pair of lower flanges 236, 237. An upper flange 234 and lower flange 236 are located within a slot (not shown) in opening 136 of second junction block end 135A. The flanges 235 and 237 are located within a slot (not shown) of a first end 135 of another junction block 122A. Junction block connector 230 is attached to end 135A and end 135 of junction blocks 122 and 122A, respectively, when the halves of the junction block are separated, such as at a factory installation. Female connector block pair 134A has upper lugs 138 and lower lugs 139 for alternative positioning within upper and lower slots (not shown) in opening 136 of second junction block end 135A, such that the junction block 122 or 122A may perform as a single junction block.

Turning now to FIGS. 2–4, an electrical outlet receptacle block 200 for connection to female receptacles 188 of junction blocks 122, 122A, and 250, 250A (FIG. 7) is shown. Receptacle block 200 includes a first open end 201 and a second open end 202. First and second open ends 201, 202 include a plurality of male terminals 203 for connection with a plurality of female terminals (not shown) located in the female receptacle connectors 188 on the junction blocks. An upper receptacle portion 204 includes a pair of receptacles 205 for receiving receptacle plugs (not shown) of electrically operated equipment. An upper wall 206 and lower wall 207 are spaced apart in order to provide a snug fit between upper wall 128 and lower wall 126 of the junction blocks. Receptacle 200 is provided with a spring latch 208 disposed in recess 210 in the lower surface 207 of receptacle 200. Lower surface 207 engages the lower wall 126 when the receptacle 200 is installed in one of the junction blocks. The locking flange 131 on lower wall 126 will be aligned with recess 210 when the receptacle 200 is inserted between the upper and lower walls 128, 126, causing the spring latch 208 to be depressed. The receptacle 200 may then be moved to either the left or to the right (depending on which side of the junction block receptacle 200 is being installed) to engage one of the open ends 201, 202 such that male connectors 203 engage female connectors (not shown) with a female receptacle 188. Recesses 212 are provided in receptacle 200 to accommodate locking flange 131 on lower wall 126 and movement to either the left or the right by sufficient distance will cause the spring latch 208 to be moved past locking flange 131, causing the spring latch 208 to return to its extended position. Hence, receptacle 200 will be retained in a locked position. The receptacle 200 may be removed by depressing spring latch 208 and sliding the receptacle 200 to either the left or right to align the locking flange 131 with recess 210.

Turning now to FIG. 6, a modified junction block 250 is shown for attachment to a junction block 122, 122A, or to another modified junction block 250. Junction block 250 is equivalent to junction block 122, with a few exceptions. Like parts are referred to with like numerals in both junction blocks. Junction block 250 includes a lower stacker assembly 252. Lower stacker assembly 252 includes a retaining tab 254, a left support bracket 256 and a right support bracket 258 formed integrally with a bottom surface of lower wall 126. Lower stacker assembly 252 is preferably constructed of the same material as the junction blocks, but may be constructed of other materials as well.

Lower junction block 122 is secured in position relative to upper junction block 250 by engagement of the support brackets 256, 258 with the L-shaped mounting lugs 175, 176, respectively, and by engagement of retaining tab 254 with interlocking latch members 178, 180 as disclosed in my U.S. Pat. No. 4,993,576 issued Feb. 19, 1991, the subject matter of which is incorporated by reference herein. By this arrangement and the arrangement shown in FIG. 5 previously described, a first stacked junction block set 260 comprised of junction block 122 and modified junction block 250 stacked together are attached to a second stacked junction block set 262 comprised of junction block 122A and modified junction block 250A as shown in FIG. 7. A double male connector assembly 218 mechanically and preferrably electrically block 250 and block 250A, and block 122 and 122A. Other double male connector assemblies 218 may be provided on opposite ends of blocks 250, 250A, 122, 122A for providing more receptacle spaces. Likewise, blocks 250 and 250A may be stacked upon each other to provide any number of vertically extending receptacles as desired, and may be connected laterally so as provide any number of horizontally extending receptacles as shown in phantom lines in FIG. 7. In place of double male assembly 218, junction block connector 230 may be used to alternatively connect two junction blocks together laterally. Moreover, although male connector 218 is shown as a separate element for each of the stackable assemblies, male connector 218 may be formed of one piece and have several terminals, i.e., four terminals for interconnecting four junction blocks, or any number of terminals for interconnecting any number of vertically and horizontally extending junction blocks.

Figure 8:
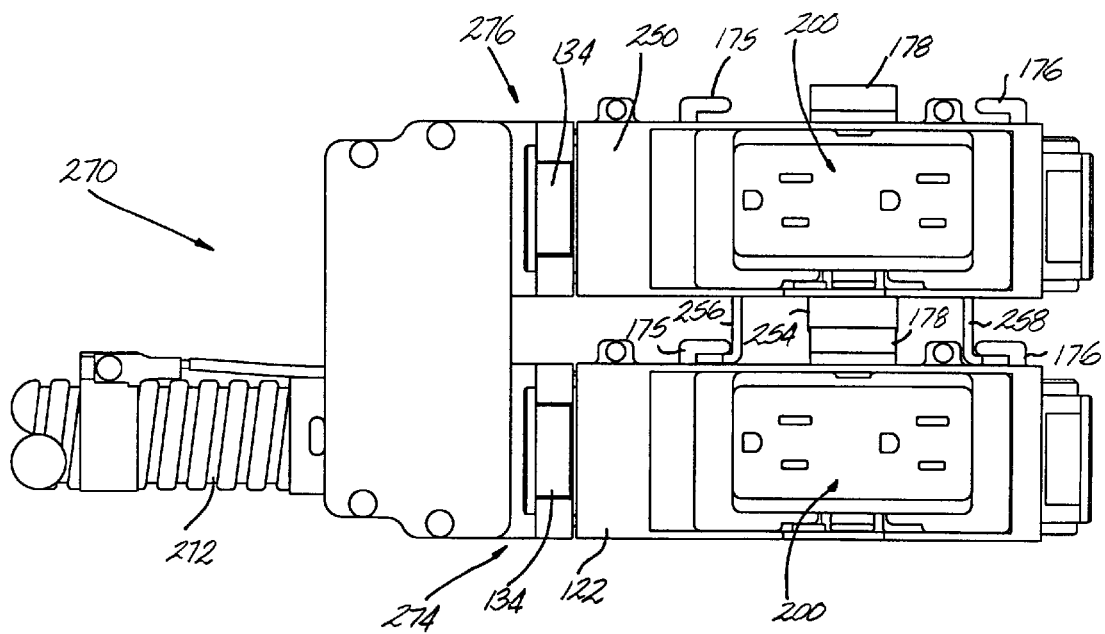
FIG. 8 is a side view of two junction blocks in a stacked relationship having a single connector plug for supplying separate electrical circuits to each junction block.

Turning now to FIG. 8, a lower block 122 and upper block 250 are attached together in a stacked relationship. A dual male connector block 270 has a single conduit section 272 for providing power to both junction blocks 122 and 250. Single conduit section 272 carries twice the amount of electrical cable (not shown) than in a single male connector block configuration. The dual male connector block 270 includes a first male connector portion 274 and second male connector portion 276 for connection to a female connector block 134 of junction block 122 and female connector block 134 of junction block 250, respectively. The provision of a single conduit 272 with twice as many wires for the dual male connector block 270 saves space and installation time when installing the various parts described, and permits the connector blocks 134 of each junction block to be independently electrically connected.

Figure 9:
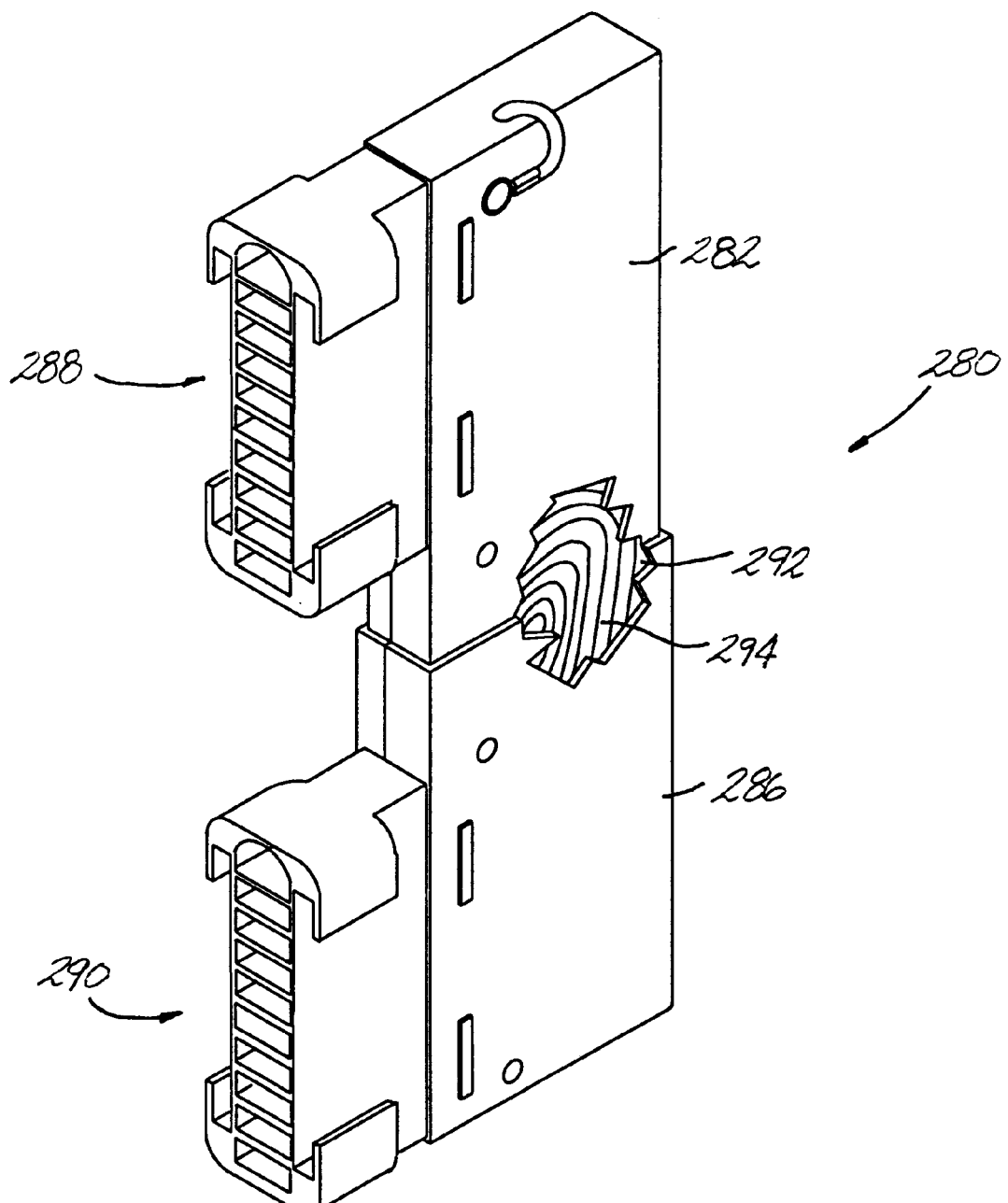
FIG. 9 is an orthographic view of a second embodiment of the single plug connector of FIG. 8.

Referring now to FIG. 9, a dual male connector block 280 according to a second embodiment of the invention is shown. Dual male connector block 280 has a first telescopic portion 282 received within a second telescopic portion 286. First telescopic portion 282 has a first male connector portion 288 and second telescopic portion 286 has a second male connector portion 290. Male connector portions 288, 290 are identical to male connector portion 220 previously described. Dual male connector block 280 is provided with an interspatial area 292, as shown in a partially broken away view in FIG. 9. The interspatial area 292 is provided for storage of excess length of electrical wiring 294 in a coiled relationship or other configuration. The excess length of electrical wiring 294 may be withdrawn when telescopic portions 282, 286 are extended. This arrangement is similar to that disclosed in my earlier patent, U.S. Pat. No. 4,579,403 (Dated Apr. 2, 1986) and entitled ELECTRICAL JUNCTION ASSEMBLY WITH ADJUSTABLE CONNECTORS. A single conduit such as conduit 272 shown in FIG. 8 or a double conduit may be provided to the telescopic male connector block 280 for providing electrical power to the male connector portions 288, 290. The telescoping dual male connector arrangement permits adjustment of two vertically spaced junction blocks. It is contemplated that the dual male connector block 280 is extendable in a range from approximately 2" to approximately 8". In an arrangement where three or more junction blocks are mechanically connected in a stacked relationship, a telescopic dual male connector block 280 can be used to supply power to any two of the junction blocks.

Referring now to FIGS. 10 and 11, a first junction block 122 receives a second junction block 250 in a stacked arrangement as previously described with respect to FIGS. 6 and 7. Each junction block 122, 250 includes a conduit section 142 and a male electrical connector block 145. Male connector blocks 145 are similar in construction to male connector blocks 145 disclosed in my U.S. Pat. No. 5,096,434. When stacked systems are installed, such as shown in FIGS. 10 and 11, usually one system is already in place. When the second system is installed in a stacking arrangement, for example, when a set of dedicated lines are needed for a computer or other equipment requiring special electrical service, sometimes only one outlet in a raceway opening in the wall panel will be used. Instead of creating a separate outlet opening in the wall panel raceway, a stretch receptacle 300 may be provided. Stretch receptacle 300 is identical to receptacle 200 shown in FIGS. 3 and 4, with a few exceptions, and therefore like parts are referred to by like numerals. The only difference between receptacle 300 and receptacle 200 is that receptacle 300 has a stretch portion that positions upper receptacle portion 204 in alignment with the stacked junction block as shown in FIG. 11.

Figure 13:
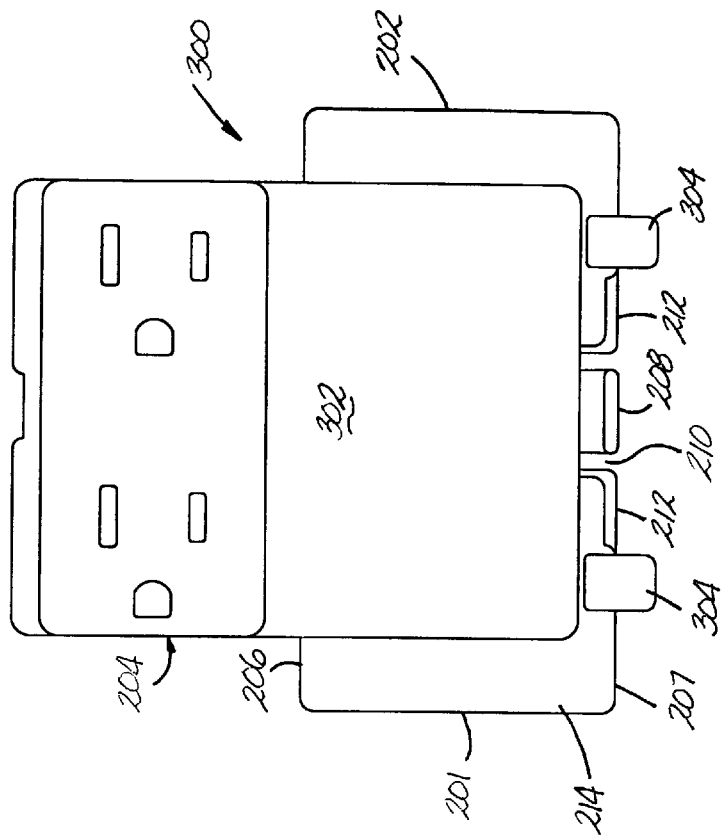
FIG. 13 is a side view of the stretch receptacle of FIG. 12.
Figure 12:
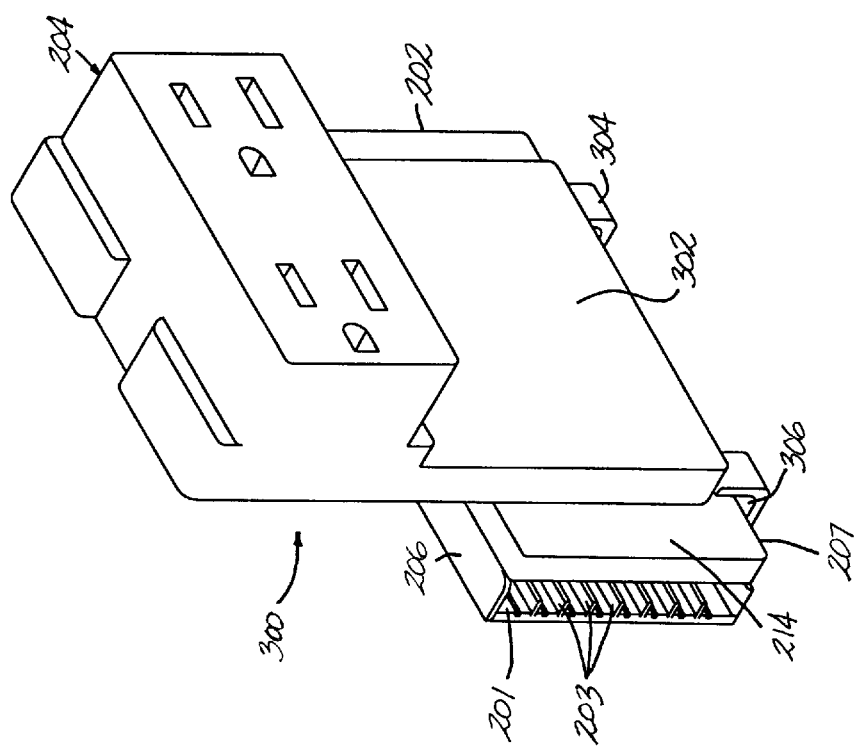
FIG. 12 is an orthographic view of the stretch receptacle.

Details of the stretch receptacle 300 are shown in FIGS. 12 and 13, and includes a stretch portion 302 integrally attached between an upper receptacle portion 204 and a front wall 214. L-shaped brackets 304 are integrally attached to front wall 214 and extend downwardly therefrom as shown in FIGS. 12 and 13. An arm of each L-shaped bracket 304 forms a space 306 between lower wall 207 and brackets 304. Space 306 is approximately equal to the thickness of lower wall 126 of the junction blocks 122, 250. When stretch receptacle 300 is installed in FIG. 11, space 306 is occupied by the thickness of lower wall 126 of the junction block 122. This arrangement provides additional resistance against torque that may be applied against flange 131 when an electrical plug (not shown) is inserted into upper receptacle portion 204. In use, when a dedicated parallel line with stacked junction blocks is attached below a preexisting line and junction block arrangement, a pre-existing receptacle 200 is removed from the upper pre-existing junction block, and a stretch receptacle 300 is connected to the lower newly installed junction block such that upper receptacle portion 204 of stretch receptacle 200 is in alignment with the pre-existing raceway opening. It will be apparent that the procedure may be reversed when a dedicated parallel line and junction block arrangement is installed above a pre-existing line and junction block arrangement, the stretch receptacle would extend downwardly such that receptacle portion 204 extends below the dedicated junction block.

Referring now to FIG. 14, there is shown two pairs of stacked junction blocks 122, 250 spaced laterally from each other. Conduit sections 142 interconnect male electrical connector blocks 145 with stacked junction blocks 122, 250. Male connector blocks 145 are in turn adapted for connection to female connector block pairs 134A to form a continuous stacked junction block system. The system may be continued as long a required by a particular wall panel or desk configuration. It is contemplated that any combination of receptacles 200, 300 may be provided throughout the length of the stacked junction block system.

Figure 15:
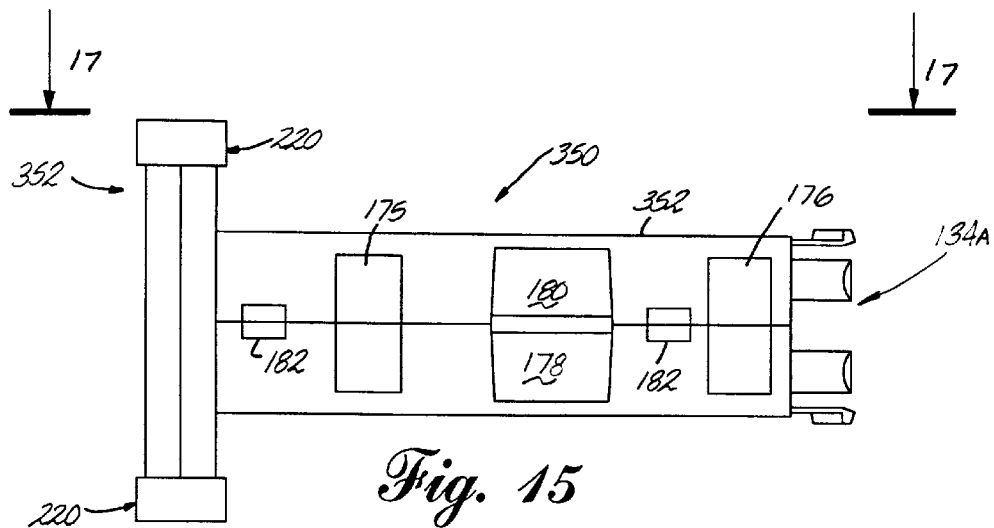
FIG. 15 is a top view of a T-shaped junction block according to a further feature of the invention.
Figure 17:
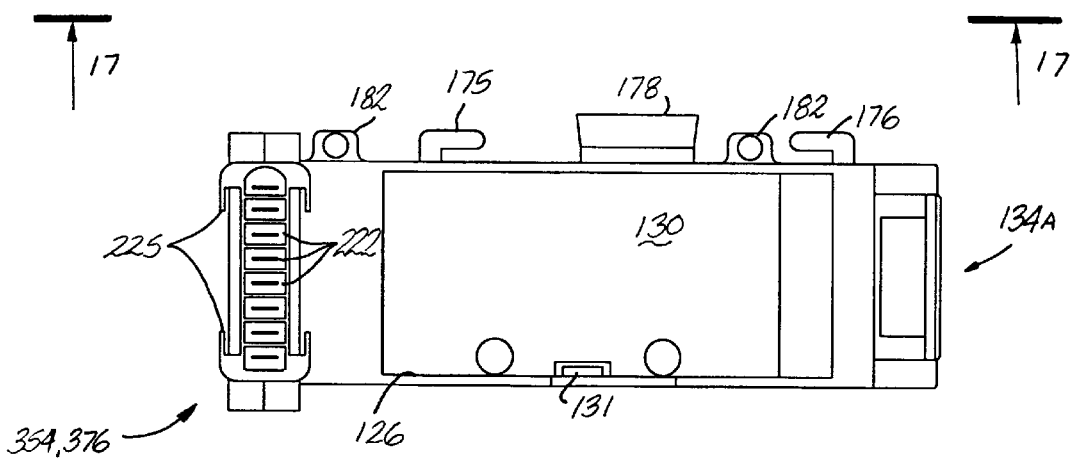
FIG. 17 is a side view taken along lines 17—17 of FIGS. 15 and 16 showing the end connection of the T-shaped or L-shaped terminal.

Referring now to FIGS. 15 and 17, there is shown a plan view of a T-shaped connector block 350 having a junction block portion 352 and a dual male electrical connector block portion 354. Junction block portion 352 is similar in arrangement to junction block 122 previously described and therefore like elements are identified by like numerals. Dual male block portion 354 is integrally attached to junction block portion 352 and is similar in connection to double male connector assembly 218 previously described.

Figure 16:
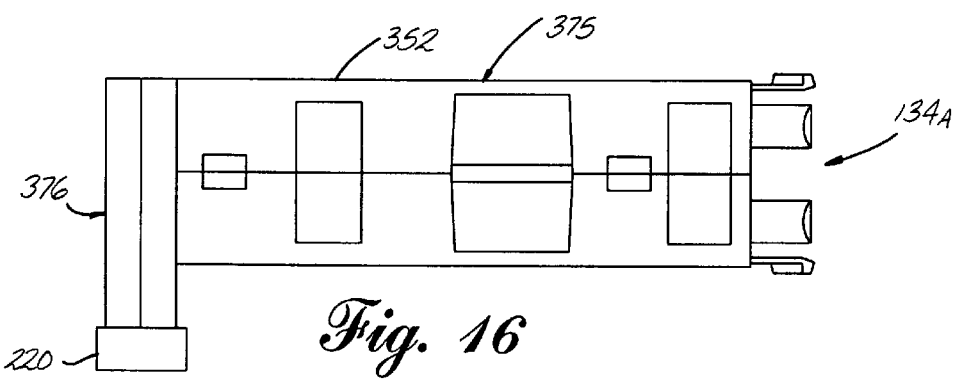
FIG. 16 is a top view of an L-shaped junction block according to a further feature of the invention.

Referring now to FIG. 16, there is shown an L-shaped connector block 375 having a junction block portion 352 identical to junction block portion 352 of FIG. 15 and a single male electrical connector block portion 376. Connector block 376 is similar in construction to one side of double male connector assembly 218 and includes a male connector portion 220. Male connector portions 220 of T-shaped junction block 350 and L-shaped junction block 375 are adapted for connection to a female connector block pair 134 or 134A of a junction block 122 or 250. This arrangement permits junction blocks to be extended around inside and/or outside corners of wall panels or other office furniture.

It will be understood that the embodiments disclosed herein are only illustrative of the invention and numerous other arrangements may be derived by those skilled in the art without departing from the spirit and scope of the invention.

What is claimed is:

1. An interconnection assembly for use in a space-divider wall system including a plurality of modular upright wall panels having vertically extending opposite end edges and a raceway area extending at least partially between said opposite edges for supporting electrical conductors and junction blocks, said assembly adapted to be mounted in said raceway and comprising:

first and second junction blocks for receiving electrical receptacles;

a first connector associated with said first junction block at its lower portion, and a second connector, having a shape and configuration different from the shape and configuration of said first connector, associated with said second junction block at its upper portion for mechanically securing said junction blocks together in a vertically stacked relationship, whereby said first junction block is positioned above said second junction block;

a pair of first connector blocks, each connector block electrically connected to an end of a different one of said first and said second junction blocks; and a dual second connector block, electrically connectable to both of said pair of first connector blocks, and comprising only a single conduit section for providing power to said first and said second junction blocks.

2. An interconnection assembly according to claim 1 wherein each of said first and second junction blocks comprises a first end, a second end separated from said first end, and top and bottom portions extending between and connecting the first and second ends, and wherein said first connector is located on the top portion of the first junction block and the second connector is located on the bottom portion of the second junction block for mating with the first connector to thereby mechanically secure the junction blocks together in the stacked relationship.

3. An interconnection assembly according to claim 2 wherein the second connector includes first and second spaced-apart support brackets and a retainer extending downwardly from the bottom portion of the second junction block;

the first connector including first and second spaced-apart attachment lugs extending upwardly from the top portion of the first junction block for slidably engaging the first and second support brackets, respectively, and a pair of opposing interlocking movable latch members hingedly attached to the upper portion of the first junction block and defining therebetween a channel for engaging the retainer;

wherein each of the interlocking latch members is operable to disengage both of the latch members from the retainer in response to an external force on either of the latch members to allow sliding movement of the support brackets with respect to the attachment lugs and therefore sliding movement of the second junction block with respect to the first junction block.

4. An interconnection assembly according to claim 2 wherein at least the first end of each junction block includes a first set of spaced-apart electrical terminals, and further comprising a connector block having a second set of spaced-apart electrical terminals that mates with one of the first sets and a third set of spaced-apart electrical terminals that mates with the other of the first sets for supplying electrical power to each of the junction blocks.

5. An interconnection assembly according to claim 4 wherein the connector block has a first portion that is telescopically received in a second portion, and wherein the third set of electrical terminals extends from the first portion and the fourth set of electrical terminals extends from the second portion such that the third and fourth sets are movable toward and away from each other so as to accommodate variance in terminal spacing.

6. An interconnection assembly according to claim 2 wherein each junction block further comprises a front and rear side, each side extending between the first and second ends and the top and bottom portions, at least one of the sides of each junction block including a receptacle connector for receiving an outlet receptacle block.

7. An interconnection assembly according to claim 6 and further comprising an outlet receptacle block having at one end thereof a plurality of terminals for electrical connection with corresponding terminals in the receptacle connector of one of the junction blocks, the outlet receptacle block further comprising a receptacle portion for receiving at least one electrical plug, the receptacle portion being spaced a predetermined distance from the electrical terminals by an intermediate portion that extends between the outlet receptacle electrical terminals and the receptacle portion, such that the receptacle portion is in alignment with the at least one side of the other junction block.

8. An interconnection assembly according to claim 2 and further comprising a third junction block having a first end, a second end separated from the first end, and top and bottom portions extending between and connecting the first and second ends, and wherein a third connector is located at the second end of at least one of the first and second junction blocks and a fourth connector is located at the first end of the third junction block for at least mechanically securing the third junction block to one of the first and second junction blocks in a side-by-side relationship.

9. An interconnection assembly according to claim 8 and further comprising a connector member that extends between the third and fourth connectors, the connector member having a first end that mates with the third connector and a second end that mates with the fourth connector for mechanically securing the junction blocks together.

10. An interconnection assembly according to claim 9 and further comprising a plurality of insulated electrical conductors extending at least to the first end of one of the first and second junction blocks for supplying electrical power thereto, and wherein the third connector comprises a plurality of spaced electrical terminals, each terminal being in electrical contact with one of the plurality of conductors;

the fourth connector comprising a plurality of spaced electrical terminals;

the first and second ends of the connector member include a plurality of spaced electrical terminals that mate with the terminals of the third and fourth connectors to electrically join the third junction block to one of the first and second junction blocks;

whereby the connector member mechanically secures and electrically joins the third junction block and the one junction block together.

11. An interconnection assembly according to claim 8 wherein the third and fourth connectors comprise a first pair of upper and lower flanges and a second pair of upper and lower flanges, respectively, the upper and lower flanges of the first pair being joined to the upper and lower flanges of the second pair by an integrally formed intermediate web portion; and the second end of at least one of the first and second junction blocks including cooperating upper and lower members for receiving and holding the upper and lower flanges of the first pair, and the first end of the third junction block including cooperating upper and lower members for receiving and holding the upper and lower flanges of the second pair to thereby mechanically secure the third junction block to one of the first and second junction blocks in the side-by-side relationship.

12. An interconnection assembly according to claim 1 wherein at least one of the junction blocks is L-shaped in configuration.

13. An interconnection assembly according to claim 1 wherein at least one of the junction blocks is T-shaped in configuration.

* * * * *